United States Patent
Damsgaard et al.

(10) Patent No.: US 11,563,389 B2
(45) Date of Patent: Jan. 24, 2023

(54) METHOD FOR STARTING A SINGLE-PHASE INDUCTION MOTOR

(75) Inventors: Torben Damsgaard, Toftlund (DK); Robert Ehmsen, Flensburg (DE); Florin Lungeanu, Egernsund (DK); Rasmus Fink, Sonderborg (DK); Lars Berthelsen, Kolding (DK); Melissa Drechsel Kidd, Muskego, WI (US); William James Genaw, New Berlin, WI (US); Micheal Robert Pasche, Sharon, WI (US); Gary Thomas Baase, II, Kenosha, WI (US)

(73) Assignees: Danfoss Customised Power Electronics, Graasten (DK); Sta-Rite Industries Inc., Delawan, WI (US)

(*) Notice: Subject to any disclaimer, the term of this patent is extended or adjusted under 35 U.S.C. 154(b) by 1448 days.

(21) Appl. No.: 12/847,582

(22) Filed: Jul. 30, 2010

(65) Prior Publication Data

US 2012/0025748 A1    Feb. 2, 2012

(51) Int. Cl.
*H02P 1/42*    (2006.01)

(52) U.S. Cl.
CPC .............. *H02P 1/426* (2013.01); *H02P 1/423* (2013.01)

(58) Field of Classification Search
CPC ................................. H02P 1/423; H02P 1/426
USPC .............................................. 318/809; 62/115
See application file for complete search history.

(56) References Cited

U.S. PATENT DOCUMENTS

| | | | | |
|---|---|---|---|---|
| 4,012,679 A | * | 3/1977 | Matsuda | H02P 1/52 318/713 |
| 4,401,933 A | * | 8/1983 | Davy | H02P 1/42 318/778 |
| 4,486,700 A | * | 12/1984 | Kawate | H02P 1/42 318/781 |
| 4,642,543 A | * | 2/1987 | MacMinn | H02P 1/163 318/696 |
| 4,724,680 A | * | 2/1988 | Kawai | G05D 23/20 318/807 |

(Continued)

FOREIGN PATENT DOCUMENTS

| CN | 1549439 A | 11/2004 |
|---|---|---|
| CN | 1679227 A | 10/2005 |

(Continued)

OTHER PUBLICATIONS

International Search Report for PCT/DK2011/000086 dated Jun. 12, 2012.

*Primary Examiner* — Eduardo Colon Santana
*Assistant Examiner* — Devon A Joseph
(74) *Attorney, Agent, or Firm* — McCormick, Paulding & Huber PLLC

(57) ABSTRACT

The invention relates to a method (19) for starting an electric single-phase induction motor (1), wherein during a start-up interval of the start-up cycle for starting said electric motor (1), the frequency ($f_{ref}$) of the electric current for driving said electric motor (1) is set to a first frequency ($f_{start}$), and later to the operating frequency ($f_{run}$) of the electric motor (1), wherein the first frequency ($f_{start}$) is higher than the operating frequency ($f_{run}$).

15 Claims, 2 Drawing Sheets

(56) References Cited

U.S. PATENT DOCUMENTS

| | | | | |
|---|---|---|---|---|
| 4,833,628 A * | 5/1989 | Curran, Jr. | | G05F 1/70 318/729 |
| 4,999,560 A | 3/1991 | Morishima et al. | | |
| 5,508,905 A * | 4/1996 | Reichard | | H02M 7/49 363/71 |
| 5,519,337 A * | 5/1996 | Casada | | G01R 31/343 324/545 |
| 5,828,200 A * | 10/1998 | Ligman | | H02P 23/0004 318/729 |
| 5,883,489 A * | 3/1999 | Konrad | | F04D 15/0066 318/805 |
| 6,025,693 A * | 2/2000 | Smith | | H02P 1/265 318/768 |
| 6,050,776 A * | 4/2000 | Akagi | | F01D 5/22 415/138 |
| 6,150,776 A * | 11/2000 | Potter | | H02P 1/30 318/139 |
| 6,160,372 A * | 12/2000 | Cusack | | H02P 1/40 318/785 |
| 6,239,563 B1 * | 5/2001 | Kunz | | H02P 1/465 318/400.07 |
| 6,829,565 B2 * | 12/2004 | Siegel | | G05B 19/406 702/182 |
| 6,845,305 B1 * | 1/2005 | Raftari | | B60K 6/445 477/2 |
| 7,272,302 B2 * | 9/2007 | Woodward | | B60H 1/00428 388/801 |
| 8,386,104 B2 * | 2/2013 | Kuang | | B60K 35/00 701/22 |
| 8,760,089 B2 * | 6/2014 | Smith | | H02K 27/04 318/785 |
| 9,577,556 B2 * | 2/2017 | Sullivan | | H02P 1/46 |
| 2003/0043060 A1 * | 3/2003 | Wei | | G09G 3/3696 341/141 |
| 2003/0043606 A1 * | 3/2003 | Lipo | | H02P 27/048 363/41 |
| 2004/0012353 A1 * | 1/2004 | Seima | | H02P 1/40 318/432 |
| 2004/0017234 A1 * | 1/2004 | Tam | | G06F 1/324 327/141 |
| 2004/0067050 A1 * | 4/2004 | Woodward | | H02P 25/04 388/804 |
| 2007/0024231 A1 * | 2/2007 | Lee | | H02P 27/047 318/802 |
| 2007/0035897 A1 * | 2/2007 | Simon | | H02H 7/0816 361/29 |
| 2008/0072619 A1 * | 3/2008 | Nojima | | F25B 49/025 62/498 |
| 2010/0019707 A1 * | 1/2010 | Dooley | | H02P 6/22 318/400.11 |
| 2011/0068718 A1 * | 3/2011 | Murakami | | G02B 7/04 318/116 |

FOREIGN PATENT DOCUMENTS

| | | |
|---|---|---|
| EP | 1538735 A1 | 6/2005 |
| SU | 464 948 A1 | 3/1975 |

* cited by examiner

METHOD FOR STARTING A SINGLE-PHASE INDUCTION MOTOR

FIELD OF THE INVENTION

The invention relates to a method for starting an electric motor, comprising two electric supply conductors for driving said electric motor at least in part and/or at least at times, wherein during a start-up interval of the start-up cycle for starting said electric motor, the frequency of the electric current for driving said electric motor is set to at least one frequency and later to the operating frequency of said electric motor. The invention further relates to a controller unit for an electric motor. Finally, the invention relates to an electric motor device, in particular to a single-phase induction motor device.

BACKGROUND OF THE INVENTION

Electric motors as such are well known in the state of the art and used for converting electric energy to mechanical energy. Depending on the situation and requirements of a certain task, different types of electric motors are used.

One particular requirement often occurring is the possibility to drive the electric motor at variable speeds (rotational speeds). Another requirement is a long lifetime and a simple construction of the electric motor. Both requirements are useful in reducing initial cost as well as the cost for the overall lifetime.

So-called induction motors are widely used for achieving said requirements. In principle, induction motors have a rotor in form of a cage, wherein the electric conductors within the cage are always short-circuited. The movement of the rotor is induced by applying a rotating magnetic field by means of the stator. For this purpose, usually a multiphase alternating electric current—a so-called rotating electric current—is applied to the different electric coils within the stator. Each phase of the electric current is connected to one of different groups of electric coils in the stator. The different groups of electric coils as well as the electric phases are connected and arranged in a way that a rotating magnetic field is created.

Depending on the rotation speed of the rotating magnetic field, the rotor of the electric motor will run at different speeds. The rotation speed of the rotor will be approximately the same as the rotation speed of the magnetic field, generated by the stator. Nevertheless, a small slip will occur, resulting in a slightly reduced rotation speed of the rotor, as compared to the rotating speed of the magnetic field.

For achieving different rotation speeds of the induction motor, it is necessary to provide the electric motor with an appropriately phase shifted rotating electric current of variable frequency. Such a rotating current can nowadays be provided easily and relatively inexpensively by using electric inverters.

However, sometimes there is a requirement that only two supply lines for supplying the electric motor with electric energy are desired. This requirement occurs frequently, when existing machinery is to be upgraded. Here, sometimes the requirement occurs that a standard, two-phase electric motor (presumably with a fixed rotation speed) is to be replaced by a variable electric motor. In such a situation, providing an additional electric conductor is usually too expensive and/or problematic or not possible at all.

In such a situation, so-called two-phase induction motors can be used. To be able to produce a rotating magnetic field out of a two-phase electric current, usually two separate groups of electric coils (so-called windings) are used, namely the main winding and the auxiliary winding. To generate a phase shift between the two windings, an electric component is needed that shifts the phase of (part of) the electric current. Usually, capacitors are used for this task. This way, by an appropriate assembly of the main winding and the auxiliary winding on the stator, a rotating magnetic field can be produced, so that the motor can be started from a halted state.

A big disadvantage of single-phase induction motors is that during the start-up phase (in particular at zero or very low rotating speeds) the electric motor has a very low impedance and consequently an extremely high current is drawn, unless special precautions are made. According to the state of the art, safety resistors are frequently introduced in series to the electric windings of the electric motor during the start-up phase. This way, overheating effects and a too high load on the electric source can be avoided.

Nevertheless, yet another problem still persists. Since the maximum generated torque is a function of both the electric current and the rotor speed, the initial torque is comparatively low. Hence, the safety resistors are not allowed to be too restrictive. Normally, a current that is about five times larger than the nominal current of the electric motor is provided for initially supplying the electric motor, so that a sufficiently high torque for a fast and reliable start of the electric motor is achieved. This, however, necessitates constructing many parts of the electric motor larger than it is necessary for nominal operation. This, of course, increases the weight and the cost for such an electric motor.

An example for such a multi-phase induction motor and a preferred method for starting said motor is disclosed in U.S. Pat. No. 4,999,560 A1. However, the technical system described in said document is strictly limited to multi-phase electric motors. Furthermore, additional sensors are needed for verifying the successful start-up of the electric motor.

Hence, there is still a need for an electric motor, in particular a two-phase induction motor that has less weight and can be started more reliable.

SUMMARY OF THE INVENTION

Therefore, the object of the invention is to provide for an improved electric motor.

The present invention solves this object.

It is suggested to perform a method for starting an electric motor, comprising two electric supply conductors for driving said electric motor at least in part and/or at least at times, wherein during start-up interval of the start-up cycle for starting said electric motor the frequency of the electric current for driving said electric motor is set to at least one frequency and later to the operating frequency of said electric motor in a way that at least one of said frequencies during the start-up interval and/or during the start-up cycle is at least in part and/or at least at times higher than said operating frequency. The operating frequency of the electric motor can be (at least in part and/or at least at times) determined by the design of the electric motor. For example, the following design parameters can have (at least a partial) influence on the operating frequency of the electric motor: the electric supply frequency (which is usually 50 Hz or 60 Hz; this way it is possible to bypass a frequency converter during elongated periods of time, i.e. during times when the electric motor is operated at standard operating speed); the long-term mechanical speed limit of the electric motor (which can be influenced by mechanical forces, thermal effects, energy supply limitations, design parameters and/or the like); requirements by the load that is driven by the electric motor; vibration restrictions (in particular of the surroundings in which the electric motor is used); power requirements by the load of the electric motor; and/or other limits and/or requirements. Of course, it is also possible to use any otherwise required and/or desired and/or given rotational speed of the electric motor for determining the operating frequency of the electric motor. By the wording "start-up interval", usually a time interval is denoted during which a singular start-up effort of the electric motor is made. The start-up effort is usually performed from a shut-down state (for example a halted state) to an operational state, wherein it is not necessarily guaranteed that the operational state will be achieved. Furthermore, the operational state does not necessarily has to be a "fully developed" operational state, wherein the speed of the electric motor has essentially reached the desired operating speed of the electric motor. By the wording "start-up cycle" usually a cycle is meant, wherein the electric motor is positively brought from a shut-down state (for example a halted state) to an operational state, and wherein the accomplishment of the operational state is confirmed. In the majority of start-up efforts, the start-up interval and the start-up cycle will be essentially equivalent to each other. However, in a certain percentage of the cases, the start-up cycle might comprise two or even more start-up intervals. In special cases, it is also possible that a start-up interval might extend over two or more start-up cycles. By electric supply conductors, essentially every means of transmitting electric energy is encompassed, wherein the respective conductors are usually designed and arranged in a way that the consumption of electric energy can be at least at times and/or at least in part be fulfilled by said electric conductors. Preferably, the electric motor will comprise only two electric supply conductors (wherein this is to be understood in a logical way, so that a single electric supply conductor can be designed as two parallel wires or the like). Of course, this does not exclude the existence of additional electric conductors, which might be used for transmitting control signals, measurement data, electric supply for other consumers or the like. The electric current can be provided by essentially every means. In particular, it is possible that the electric current can be provided at various frequencies, preferably at frequencies taken from a essentially continuous frequency spectra (even more preferred over a relatively wide range of up to 50 Hz, 75 Hz, 100 Hz, 200 Hz, 500 Hz, 1 kHz, 2 kHz, 5 kHz, 10 kHz, 15 kHz and/or 20 kHz). However, it is also possible that the electric current is limited to a relatively small number of different, distinct frequencies. Hence, it might be possible that only two, three, four, five, six, seven, eight, nine or ten different, distinct frequencies are used. Using a comparatively high frequency during the initial start-up process, it is possible to reduce the amount of the electric current, flowing through (parts of) the electric motor. This is, because usually the impedance is rising with frequency, so that the resulting current will be lower at higher frequencies. This effect is particularly useful during a start-up interval and/or a start-up cycle, particularly when the electric motor is still in a stopped state or is turning only very slowly.

Preferably the method is performed in a way, wherein said electric motor is at least in part and/or at least at times operated as a single-phase induction motor, wherein said single-phase induction motor preferably comprises at least one main winding and/or at least one auxiliary winding and/or at least one capacitor device. Using such a design, the method can be performed with a very small number of electric conductors and/or with a minimum amount of adaptions (in particular when replacing single-phase induction motors and/or fixed speed electric motors) in most cases. As an example, if a machine, in which an electric motor that is supplied with two electric wires is used, has to be upgraded to a variable speed machinery, such a two-phase induction motor can usually be easily used as a drop-in solution for the previous electric motor. Usually, the controlling device and/or the electric supply devices (for example a frequency inverter or the like) has to be placed apart from the two-phase induction motor in such cases. This, however, is normally no problem when using the present invention and can be easily accomplished without modifying the existing machinery in an inconvenient way. By using a design, wherein the single-phase induction motor comprises at least one main winding and/or at least one auxiliary winding and/or at least one capacitor device, it is usually possible to start the respective electric motor on its own, i.e. without using a separate mechanical start-up source or the like.

Further, it is suggested that during said start-up interval and/or during said start-up cycle the frequencies are at least in part and/or at least at times changed quickly, preferably changed essentially instantaneously, in particular to a first frequency, being higher than said operating frequency. This way, the length of the complete start-up interval and/or of the complete start-up cycle can usually be shortened, sometimes even considerably. Furthermore, a regime, wherein relatively high electric currents are flowing through the electric motor (or parts of it) can usually be avoided by this method. This is particular true for the low frequency region when the electric motor is still stopped or at a very low rotational speed.

Alternatively or additionally it is also possible to perform the method in a way that during said start-up interval and/or during said start-up cycle the frequency is at least in part and/or at least at times changed slowly, in particular changed linearly, S-shaped like and/or spline-like, in particular from a first frequency, being higher than said operating frequency to the operating frequency and/or to a catch-up frequency of said electric motor. Using such a slowly changing regime, it is usually easier (or even possible at all) to perform additional tasks, like performing some measurements. The measurements can be used for verifying whether the rotation of the electric motor has been started, as an example. This measurement can be either performed directly (for example by using a sensor for detecting a rotation of the electric motor) or indirectly (for example by using certain effects of the electric motor on the electric current that is driving the electric motor). Of course, different sensors and/or effects can be used additionally and/or alternatively. The catch-up frequency is usually lower than the operating frequency of the electric motor. Usually, catch-up frequency is of about the same order (or even essentially identical) to the actual motor speed of the electric motor. After the catch-up frequency is reached, it is possible to continue with a start-up process, where the electric motor is further accelerated to its operating frequency with standard U/f-methods (or other suitable methods).

Furthermore it is suggested, to perform the method in a way that at least said first frequency is approximately twice the operating frequency of the electric motor and/or is chosen so that the electric motor essentially yields an increased, preferably a maximum output torque. Having an increased, preferably high, even more preferred maximum output torque of the induction motor, a start-up of the electric motor will be much more likely as compared to a case, where only limited torque is present (for example like in an electric motor that is started with standard operating frequency). Furthermore, the length of the start-up interval and/or the length of the start-up cycle can usually be reduced, sometimes even considerably. First experiments have shown that choosing the first frequency to be about twice as high as the usual operating frequency of the electric motors usually provides a very good and efficient start-up procedure with relatively low (additional) effort. In particular, the electric current flowing through the electric motor can usually be limited to an acceptable level. However, it is also possible to even better adapt the ratio of the first frequency versus the operating frequency of the electric motor even better. It is even possible to set the first frequency in a way that resonance effects of the electric motor can be used (or equivalently to design the electric motor in a way that resonance effects occur, if the first frequency, being determined in a different way, is applied). In particular, the resonance effect can be the resonance of an oscillating circuit (more particularly of the LC-circuit, being formed by the capacitor and the auxiliary winding and/or the main winding). This way, a particularly advantageous start-up behaviour can be achieved.

Furthermore it is suggested to perform the method in a way that said electric motors is driven at least in part and/or at least at times in a current limiting mode, preferably in a maximum tolerable current limiting mode. This way, the maximum design limit of the electric motor and/or of the electric current supplying components can be used for a quick and/or reliable start-up of the electric motor. Both a quick and reliable start-up is advantageous, of course. It has to be noted that usually the electric and electronic components that are necessary for performing the "basic" start-up method (and hence are already present) will normally be sufficient to perform this preferred embodiment of the method. Of course, it might be necessary to include some additional components to (better) perform this suggested embodiment of the method. However, the additional equipment be can usually limited to a comparatively low level. It has to be noted that the allowed current in a current limiting mode cannot only refer to a current limit, as set forth by the electric motor, but additionally and/or alternatively to a current limit, set forth by other components, like the electric supply unit, the frequency converters (in particular the power transistors) or the like. Using such a current limiting mode can have the effect that the voltage and the frequency (and presumably even more parameters) can be optimised on their own (i.e. more or less independent from other parameters). This usually yields operational advantages. In particular, this will usually result in advantages over present algorithms in which U/f is fixed.

An even more preferred embodiment of the method can be achieved, if during the start-up interval and/or the start-up cycle the frequency is at least in part and/or at least at times lowered to essentially the actual motor rotation speed and/or to a frequency, being lower than the operating frequency of the electric motor. Using this embodiment, it is usually possible to positively verify, whether the start-up of the electric motor has actually taken place. First experiments have shown, that if the frequency is lowered (particularly to a frequency being approximately the same as the actual rotation frequency of the electric motor), the electric current through the electric motor drops significantly. At or near the actual rotating frequency of the electric motor, usually even a local minimum of the electric current can be observed, which can be used particularly well for verifying purposes (or other purposes). This frequency can be essentially identical to the previously mentioned catch-up frequency. Preferably, the method is performed in a way that another start-up cycle and/or another start-up interval is initiated if the present start-up cycle and/or the present start-up interval was not successful.

If the method is performed in a way that the success of the start-up cycle and/or the start-up interval is checked, in particular by measuring the electric current, consumed by said electric motor, a further preferred embodiment of the invention can be achieved. If this check yields an affirmative output (i.e. the electric motor has been positively started), this information can be used to end the start-up cycle and/or the start-up interval. This information can also be used to initiate a "finishing cycle", for example to further accelerate the electric motor from a catch-up speed to a standard operating speed. Furthermore, this information can be used for being transmitted to other controlling units and/or to an operator of the machinery. If, on the other hand, the check yields a negative result (i.e., the electric motor has not yet been started), this information can be used for initiating another start-up interval and/or for initiating another start-up cycle, for transmitting an error signal flag and/or to transmit the information to an operator. Additionally and/or alternatively this information can be used to shut down the complete machinery if a certain number of start-up cycles and/or start-up intervals have been performed without success. This is because the latter case is usually a good indication that something is wrong. For example, a mechanical block could be present and continuous effort to start the electric motor might result in damaging the machinery. Of course, also time-out condition can be used for initiating such a shut-down.

Additionally and/or alternatively another preferred embodiment of the method can be achieved if the frequencies used and/or the voltages used and/or the time intervals used and/or the ramp times used during the start-up cycle and/or during the start-up interval are varied, in particular between different start-up cycles and/or different start-up intervals. This way, you can have a particular fast start-up process on the average. As an example, the first start-up interval can be chosen to be very short with the (adverse) effect that only in 90% of the cases the electric motor is actually started. Now, if the electric motor was not started, a longer, second start-up interval is initiated, where in essentially all cases the electric motor is started. This, of course takes more time, say four times as much time as the first start-up interval needs. However, on the average, the overall start-up time is lower as compared to a case, were in all cases the longer "safe" length of the start-up interval would have been chosen.

Furthermore, a controller unit for an electric motor, preferably a controller unit comprising at least one frequency converter is suggested, wherein said controller unit is designed and arranged in a way that it performs at least in part and/or at least at times a method according to the previous description. Such a controller unit will show the previously described advantages and characteristics, by analogy. Of course, the controller unit can be modified in the previously described sense. The controller unit is preferably a "stand alone"-unit (where—of course—the electric motor itself can be a part of the stand-alone-unit). This way the controller unit can be sold as a separate unit, in particular for remodelling existing machinery.

Furthermore, an electric motor device, in particular a single-phase induction motor device is suggested, wherein said electric motor device comprises at least one controller unit of the previously described design and/or wherein said electric motor device is designed and arranged in a way that it performs at least in part and/or at least at times a method according to the previous description. Of course, the electric motor device will show the previously described characteristics and advantages by analogy. Furthermore, said electric motor device can be modified in the previously described sense.

BRIEF DESCRIPTION OF THE DRAWINGS

The present invention and its advantages will become more apparent, when looking at the following description of possible embodiments of the invention, which will be described with reference to the accompanying figures, which are showing.

DETAILED DESCRIPTION OF THE PREFERRED EMBODIMENTS

Figure 2:
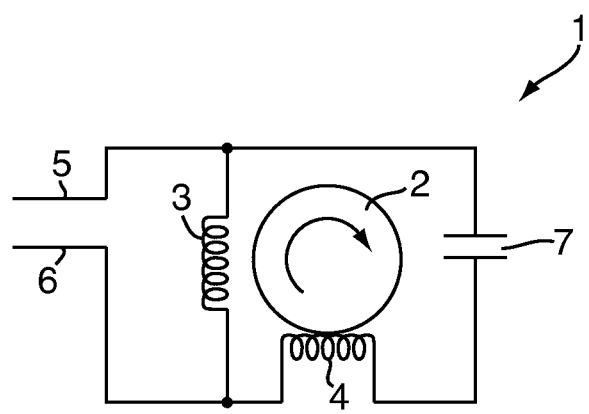
FIG. 2: a typical embodiment for a single-phase induction motor in a schematic view.

In FIG. 2 a typical embodiment of a single-phase induction motor 1 is shown in a schematic drawing. The single-phase induction motor 1 comprises a rotor 2 that is rotatably arranged inside the housing of the single-phase induction motor 1. The rotation of the rotor 2 (which is indicated by the bent arrow inside the rotor 2) is caused by a rotating magnetic field that is generated by the main winding 3 in combination with an auxiliary winding 4. Both the main winding 3 as well as the auxiliary winding 4 are forming the main part of the stator of the single-phase induction motor 1. Since the single-phase induction motor 1 comprises only two electric wires 5, 6 for its power supply, a special device has to be introduced for generating a phase shift between the main winding 3 and the auxiliary winding 4, thus enabling the generation of a rotating magnetic field. This special device is typically realised with a capacitor 7—as it is done in the present example, as shown in FIG. 2. The capacity of the capacitor 7 is chosen in a way that the phase shift between main winding 3 and auxiliary winding 4 is sufficiently shifted apart from each other, in particular when the single-phase induction motor 1 is started from a halted position.

Figure 1:
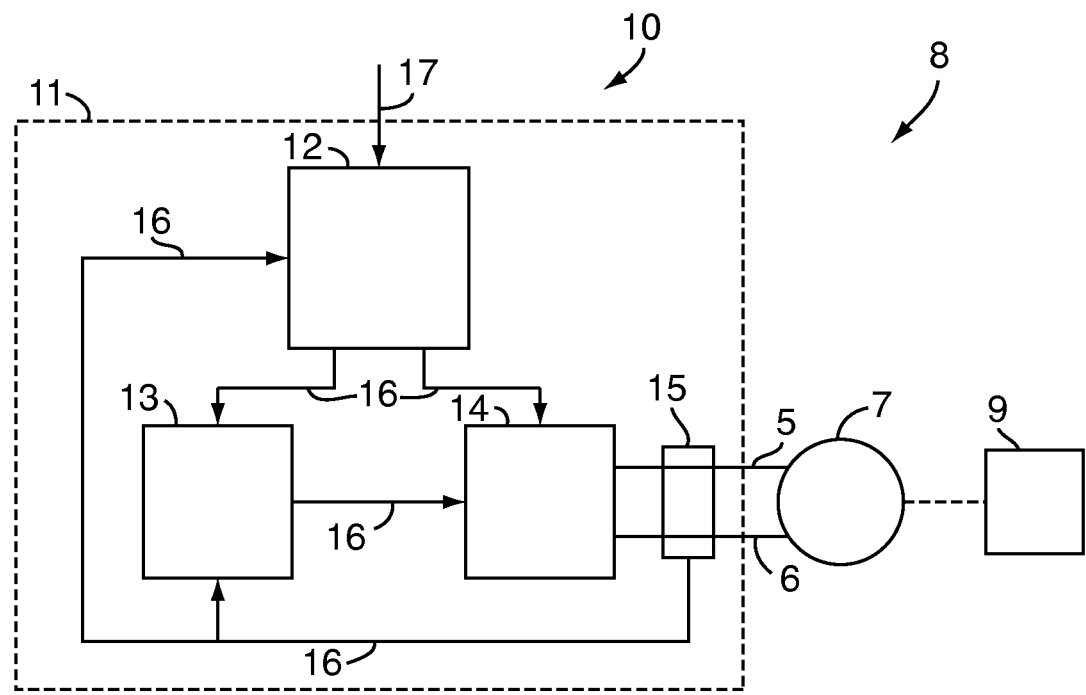
FIG. 1: a preferred embodiment of a controller for controlling the power supply to a single-phase induction motor in a schematic view.

In FIG. 1, the single-phase induction motor 1 is used as part of an arrangement 8, comprising the single-phase induction motor 1, a mechanical load 9 and a controller unit 10. In the present embodiment, the mechanical load is a pump 9. The pump 9 can be used for pumping water out of a well or out of a storage tank, for example. However, different types of mechanical loads can be equally employed.

In FIG. 1 on the left side, the controller unit 10 for the single-phase induction motor 1 is depicted. The controller unit 10 consists of several subunits 12, 13, 14, 15 that are arranged in a common housing 11 (this is indicated by a dashed line in FIG. 1). Of course, it is also possible to provide separate housings for at least some of the subunits 12, 13, 14, 15 of the controller unit 10 and/or to arrange at least some of the subunits 12, 13, 14, 15 with a certain separation from each other.

As can be seen from FIG. 1, the electric connection between the controller unit 10 and the single-phase induction motor 1 is made by only two electric wires 5, 6. This way, a single-phase induction motor 1 can be used for replacing a previously used constant speed electric motor in an already existing machinery, for example. In such a case, this replacement would introduce the possibility to drive the pump 9 at different speeds, which is obviously advantageous.

In the presently shown embodiment of the controller unit 10, essentially four subunits 12, 13, 14, 15 are depicted: the electronic controller 12, the electric current controller 13, the inverter 14 and an electric current sensor 15. The different subunits are interconnected by electric signal lines 16, where appropriate. The signal lines 16 can be (in part) of an analogue type and/or (in part) of a digital type. Of course, it is also possible that at least some of the signal lines 16 are designed as a common data bus or the like.

Figure 3:
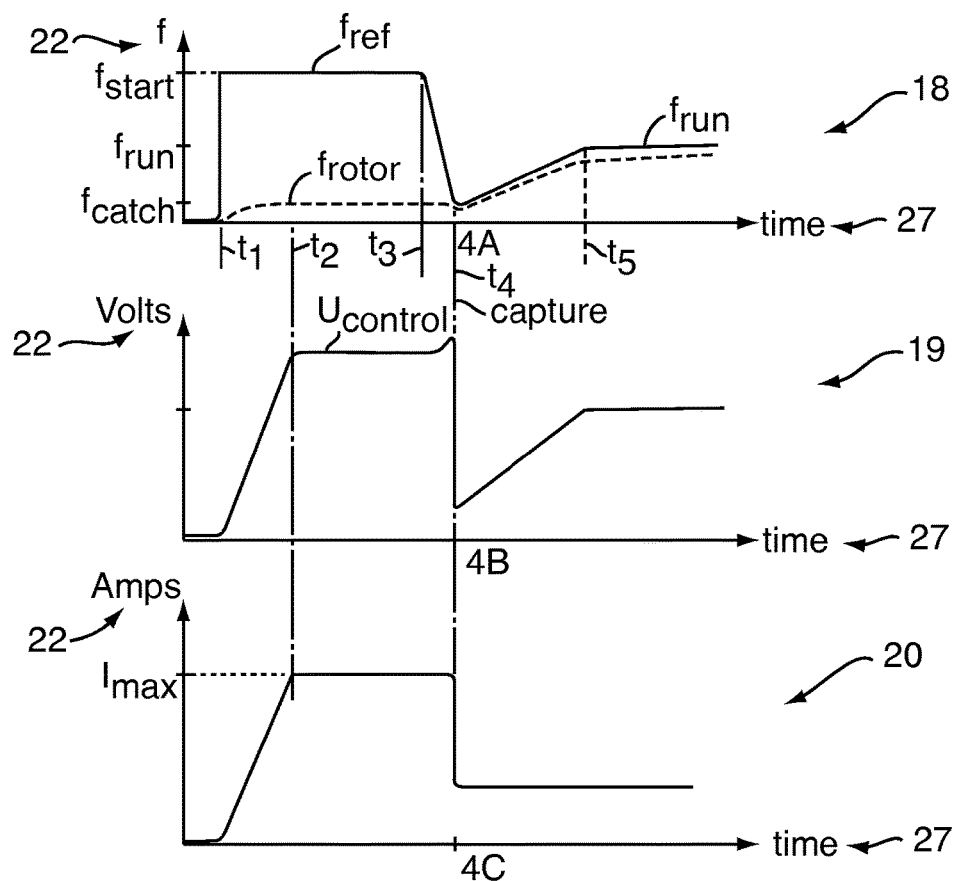
FIG. 3: a first embodiment of a method for starting a single-phase induction motor.
Figure 4:
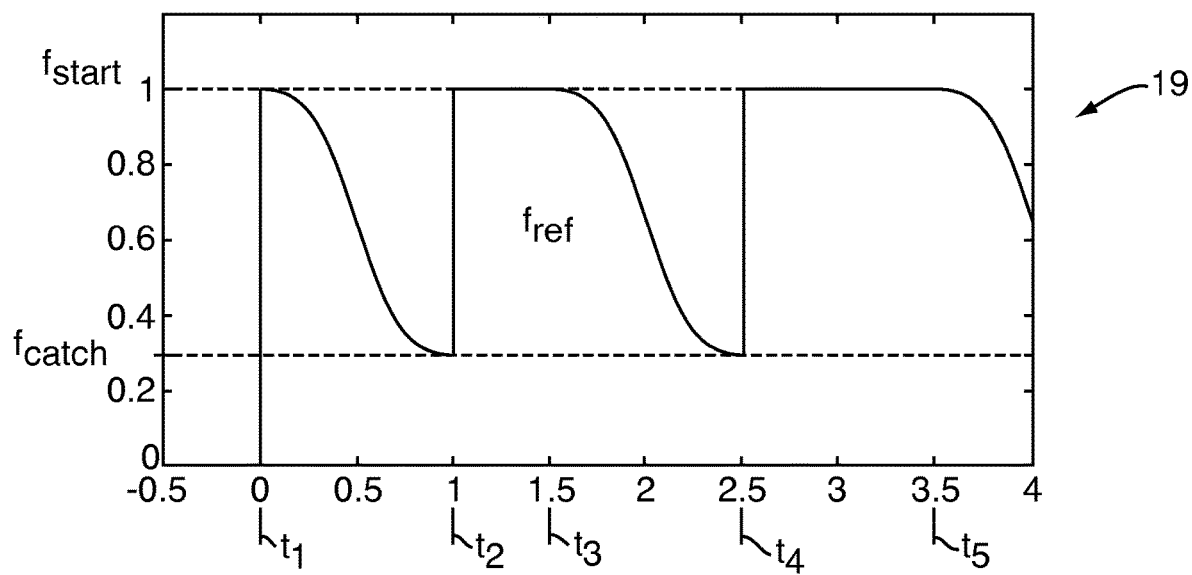
FIG. 4: a second embodiment of a method for starting a single-phase induction motor.

The electronic controller 12 performs the major controlling task. In the presently depicted embodiment, the electronic controller 12 is designed as a single printed board electronic computer unit. The electronic controller comprises several interfaces for receiving necessary data as well as for transmitting control signals. Apart from the already mentioned signal lines 16, leading to and coming from other components of the controller unit 10, the electronic controller 12 comprises an input line 17 through which command signals and the like can be inputted (and presumably status signals or the like can be outputted). The electronic controller 12 is programmed in a way to perform the start-up cycles, as shown in FIG. 3 and FIG. 4. It can be programmed in a way that it can perform only one type of start-up cycle. Also, it is possible that the electronic controller 12 is able to perform both (or other and/or additional start-up methods), as requested by the user through input line 17.

A first output signal is transmitted via one of the signal lines 16 to the electric current controller 13. Electric current controller 13 compares the target value (as set forth by the electronic controller 12) with an actual value (as measured by the electric current sensors 15). Based on this comparison, an output signal is generated that is transmitted to the inverter 14 through a signal line 16.

The inverter 14 not only receives a signal from the electric current controller 13, but also directly from the electronic controller 12. Essentially, the electronic controller 12 determines the frequency to be outputted by the inverter 14, while the signal, received from the electric current controller 13 essentially determines the voltage of the output signal and/or the duty cycle of the output signal. The output signal of the inverter 14 forms the electric power that is transmitted through the electric cables 5, 6 to the single-phase induction motor 1. In the presently shown embodiment, the amplifiers are included in the inverter 14. However, it is also possible to provide at least some of the amplifiers as separate components.

The actual electric current through the electric wires 5, 6 is measured by the electronic current sensor 15 and fed back to the electric current controller 13. Furthermore, the measured value is transmitted to the electronic controller 12 itself. This way, the electronic controller 12 is able to determine whether the start-up of the single-phase induction motor 1 has been successful, for example.

In FIG. 3 a first possible embodiment for a start-up sequence for starting a single-phase induction motor 1 is shown. In the figure, altogether three graphs are shown: the frequency graph 18 the voltage graph 19 and the electric current graph 20. In each of the graphs, on the abscissa 21 the evolving time is plotted, while on the ordinate 22 the value of the respective parameter is shown (i.e. frequency, voltage and current).

At $t_1$ the start-up sequence (the start-up interval) starts by setting $f_{ref}$ to $f_{start}$. $f_{ref}$ denotes the reference value of the frequency, as requested by the electronic controller 12. In the present example, the frequency $f_{ref}$ is set to be twice the normal operating frequency $f_{run}$ of the single-phase induction motor 1. At the same time $t_1$, the electronic controller 12 demands the electric current controller 13 to ramp up the electric current I to the maximum allowed electric current $I_{max}$. To be able to use some feedback by the electric current sensor 15, the electric current controller 13 will slowly ramp up the voltage $U_{control}$ for increasing the electric current I to the single-phase induction motor 1. As soon as the actual current I through the single-phase induction motor 1 reaches the maximum at $t_2$, a further increase of the electric current is inhibited by limiting the driving voltage $U_{control}$.

Parallel to this the rotor 2 of the single-phase induction motor 1 will start to rotate, which can be seen in the frequency graph 18. Here, the actual rotating frequency $f_{rotor}$ of the rotor 2 of the single-phase induction motor 1 is plotted. During this initial phase, starting with $t_1$ (and ending with $t_3$), the torque that can be produced by the single-phase induction motor 1 is relatively high, so that the single-phase induction motor 1 can be started even with the mechanical load (i.e. the pump 9) connected to the single-phase induction motor 1. However, due to the comparatively high frequency $f_{ref}$, the actual rotating frequency $f_{rotor}$ that can be achieved by the rotor 2 is lower than the normal rotating frequency when the single-phase induction motor 1 is driven with the nominal running frequency $f_{run}$.

After a set time (which can be chosen with a sufficiently high safety margin, so that the probability of actually starting the single-phase induction motor 1 is sufficiently high), the frequency will be ramped down to the "catching frequency" $f_{catch}$. This value is chosen to be close to the rotor frequency $f_{rotor}$ that the single-phase induction motor 1 will achieve during the initial start-up phase. After this ramp-down process, the rotor 2 of the single-phase induction motor 1 will be caught at capture time $t_4$. Here, the rotor 2 begins to follow the frequency of the driving electric current. This can be detected by a significant decrease of the current I, drawn by the single-phase induction motor 1 (and measured by the electric current sensor 15). This behaviour can be seen in the current graph 20 of FIG. 3. The small peak that can be seen in the voltage graph 19 around $t_4$ is an artefact of the controlling method.

Once the rotor 2 of the single-phase induction motor has been caught, the start-up sequence continues with a "normal" start-up sequence according to the state of the art, where the frequency f is slowly ramped up from $f_{catch}$ to the normal running frequency $f_{run}$ motor 1 is driven during normal operation. In particular, this ramp-up can be done with a constant ratio of U/f.

At $t_5$ the reference value of the frequency $f_{ref}$ is finally reaching the normal operating frequency $f_{run}$. The rotor 2 of the single-phase induction motor 1 follows with a slight delay. As it is normal for induction motors, the rotor 2 shows a slight slip as compared to the driving frequency. This behaviour is due to the design of the single-phase induction motor 1 and is normal.

The frequencies in the above described example are set to be $f_{run}$=30 Hz, $f_{catch}$=15 Hz and $f_{start}$=60 Hz.

In FIG. 4 a modification of the embodiment of a start-up method for a single-phase induction motor 1, as shown in FIG. 3, is shown. Here, only the output frequency $f_{ref}$ of the electronic controller 12 is shown for elucidating the method. Initially, at $t_1$, the reference frequency $f_{ref}$ is set to $f_{start}$ (for example 60 Hz). Having reached the starting frequency $f_{start}$ (where a quite high torque is generated in the single-phase induction motor 1), however, the frequency is not held at this value. Instead, practically instantaneously the controller unit 10 starts to lower the reference frequency $f_{ref}$ down to the catch-up frequency $f_{catch}$. In the embodiment chosen, an S-shaped ramp is chosen. However, different shapes of ramps can be chosen as well. Furthermore, it is of course possible to introduce a short time delay between $t_1$ and the beginning of the first ramp-down process.

At $t_2$ the catch-up frequency $f_{catch}$ of the single-phase induction motor 1 is reached by the reference frequency $f_{ref}$. Now, it is checked whether the single-phase induction motor 1 has been started (and reached a sufficiently high turning speed). If this start-up has been verified, the initial start-up interval ends and a "normal" ramp-up of the frequency is initialised (see time interval $t_4$ to $t_5$ in FIG. 3).

If, however, it has been detected that the single-phase induction motor 1 has not been started (and/or has not acquired a sufficiently high rotating speed), a second start-up interval is initiated at $t_2$. Now, the reference frequency $f_{ref}$, set by the electronic controller 12 is again set to the start-up frequency $f_{start}$. Now, this start-up frequency $f_{start}$ is held for a certain time span, in the presently shown example 0.5 seconds. At the end of this holding interval, at $t_3$, the reference frequency $f_{ref}$ is once again lowered to catch-up frequency $f_{catch}$. As soon as this catch-up frequency has been reached at $t_4$, it is once again checked, whether the single-phase induction motor 1 has actually been started. Once again, if the start-up of the single-phase induction motor 1 has been confirmed, the "normal" ramp-up scheme according to the time interval between $t_4$ and $t_5$ in FIG. 3 is initiated.

If, however the start-up has been not successful again, another start-up interval is started at $t_4$. Now, the starting frequency $f_{start}$ is held for one second till $t_5$, when the reference frequency $f_{ref}$ is once again lowered.

This start-up scheme is continued, until a stop condition is met. This stop condition can be derived from external parameters (for example a temperature sensor in the single-phase induction motor 1). Also, internal parameters can be used, for example a timeout condition or a minimum current $I_{stop}$, where the start-up cycle stops if the measured current is below said value of $I_{stop}$. The actual current can be determined by the (internal) electric current sensor 15.

It should be mentioned that these stop conditions can also be applied to the embodiment, as shown in FIG. 3.

While the present invention has been illustrated and described with respect to a particular embodiment thereof, it should be appreciated by those of ordinary skill in the art that various modifications to this invention may be made without departing from the spirit and scope of the present.

What is claimed is:
1. A method for starting an electric motor, comprising:
driving said electric motor at least in part and/or at least at times with two electric supply conductors;
during a start-up interval of the start-up cycle for starting said electric motor from a shut-down state to an operational state, setting the frequency ($f_{ref}$) of the electric current for driving said electric motor to at least one frequency ($f_{start}$), then to a catch-up frequency ($f_{catch}$) and later to the operating frequency ($f_{run}$) of said electric motor;

wherein said at least one frequency ($f_{start}$) during the start-up interval and/or during the start-up cycle is at least in part and/or at least at times higher than said operating frequency ($f_{run}$);

wherein the catch-up frequency ($f_{catch}$) is lower than the at least one frequency ($f_{start}$) and the operating frequency ($f_{run}$);

measuring the electric current (I) consumed by said electric motor, and determining the success of the start-up interval and/or the start-up cycle by checking whether a decrease in the current drawn by the motor occurs in response to the change in frequency ($f_{ref}$) from the frequency ($f_{start}$) to the catch-up frequency ($f_{catch}$) and to, the operating frequency ($f_{run}$), wherein a decrease in the current drawn by the motor is indicative of the success of the start-up interval and/or start-up cycle to start the electric motor from the shut-down state to the operational state.

2. The method according to claim 1, wherein said electric motor is at least in part and/or at least at times operated as a single-phase induction motor, wherein said single-phase induction motor preferably comprises at least one main winding and/or at least one auxiliary winding and/or at least one capacitor device.

3. The method according to claim 1, wherein at least said first frequency ($f_{start}$) is approximately twice the operating frequency ($f_{run}$) of the electric motor and/or is chosen so that the electric motor essentially yields an increased, preferably a maximum output torque.

4. The method according to claim 1, wherein said electric motor is driven at least in part and/or at least at times in a current limiting mode.

5. The method according to claim 4, wherein said electric motor is driven at least in part and/or at least at times in a maximum tolerable current limiting mode ($I_{max}$).

6. The method according to claim 1, wherein during the start-up interval and/or during the start-up cycle the frequency ($f_{ref}$) is at least in part and/or at least at times lowered to essentially the actual motor rotation speed ($f_{rotor}$) and/or to a frequency, being lower than the operating frequency ($f_{run}$) of the electric motor.

7. The method according to claim 1, wherein another start-up interval and/or another start-up cycle is initiated, if the present start-up interval and/or the present start-up cycle was not successful.

8. The method according to claim 1, wherein the frequencies (f) used and/or the voltages (U) used and/or the time intervals used and/or the ramp times used during the start-up interval and/or during the start-up cycle are varied, in particular between different start-up intervals and/or between different start-up cycles.

9. A controller unit for an electric motor designed and arranged in a way that it performs at least in part and/or at least at times a method according to claim 1.

10. An electric motor device comprising at least one controller unit according to claim 9.

11. The method according to claim 1, wherein the at least one frequency ($f_{start}$)=60 Hz.

12. The method according to claim 1, wherein the catch-up frequency ($f_{catch}$)=15 Hz.

13. The method according to claim 1, wherein the operating frequency ($f_{run}$)=30 Hz.

14. The method according to claim 1, wherein the at least one frequency ($f_{start}$)=60 Hz, the catch-up frequency ($f_{catch}$)=15 Hz, and the operating frequency ($f_{run}$)=30 Hz.

15. A method for starting an electric motor, comprising:
driving said electric motor at least in part and/or at least at times with two electric supply conductors;

during a start-up interval of the start-up cycle for starting said electric motor from a shut-down state to an operational state, setting the frequency ($f_{ref}$) of the electric current for driving said electric motor to at least one frequency ($f_{start}$), and later to the operating frequency ($f_{run}$) of said electric motor;

wherein said at least one frequency ($f_{start}$) during the start-up interval and/or during the start-up cycle is at least in part and/or at least at times higher than said operating frequency ($f_{run}$);

measuring the electric current (I) consumed by said electric motor, and determining the success of the start-up interval and/or the start-up cycle by checking whether a decrease in the current drawn by the motor occurs in response to the change in frequency ($f_{ref}$) from the frequency ($f_{start}$) to the operating frequency ($f_{run}$), wherein a decrease in the current drawn by the motor is indicative of the success of the start-up interval and/or start-up cycle to start the electric motor from the shut-down state to the operational state, and wherein, when said electric current for driving said electric motor is set to said at least one frequency ($f_{start}$), said electric motor is driven at least in part and/or at least at times in a maximum tolerable current limiting mode ($I_{max}$).

* * * * *